Aug. 8, 1944.  E. G. GARTIN  2,355,523
CHAIN BREAKER
Filed Oct. 30, 1942  2 Sheets-Sheet 1
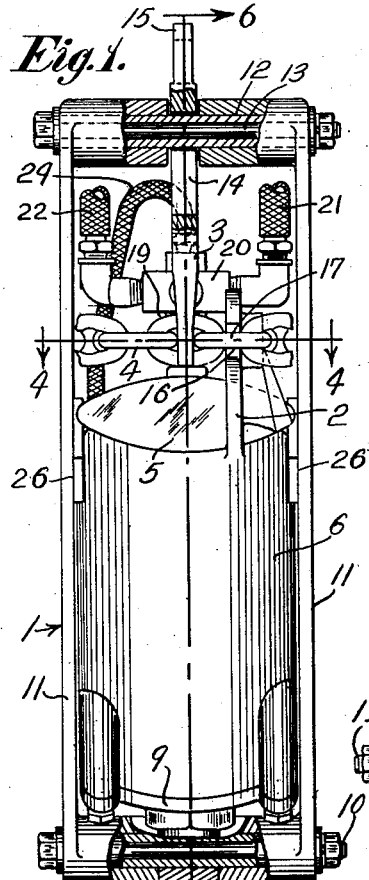
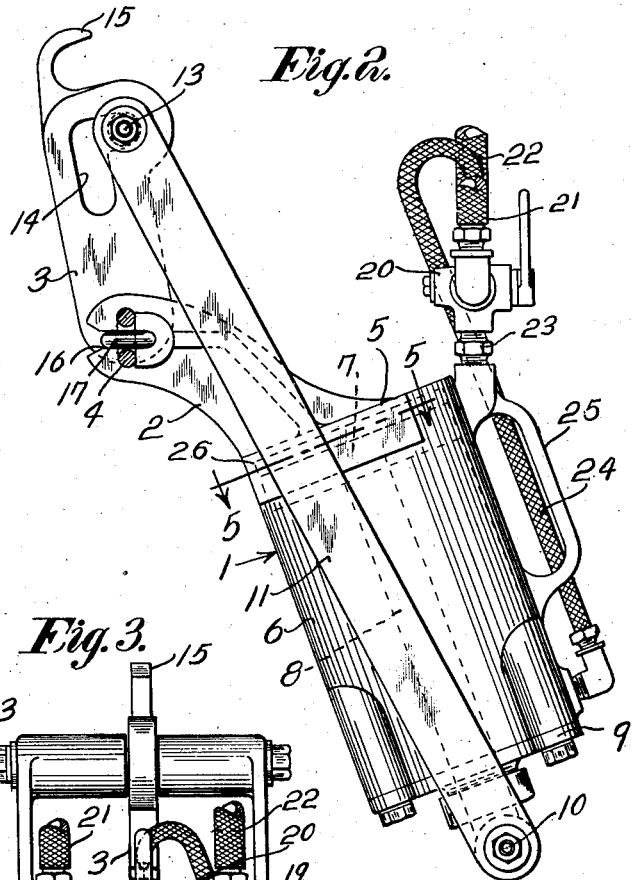
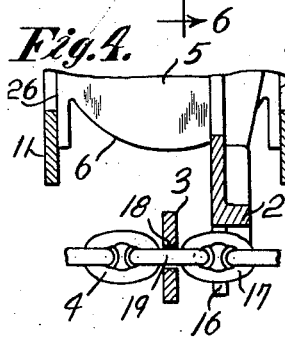
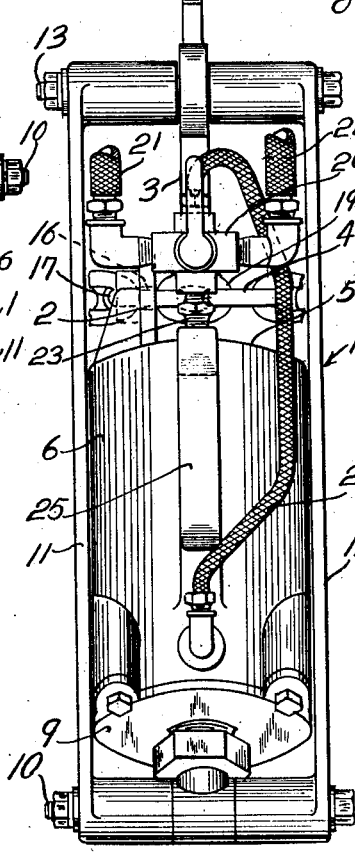
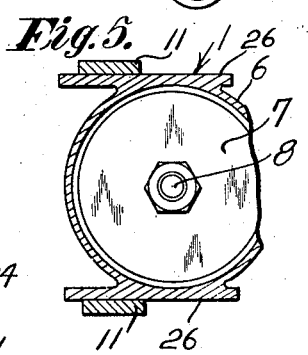
Inventor:
Elmer G. Gartin.
by
Atty.

Aug. 8, 1944. E. G. GARTIN 2,355,523
CHAIN BREAKER
Filed Oct. 30, 1942 2 Sheets-Sheet 2
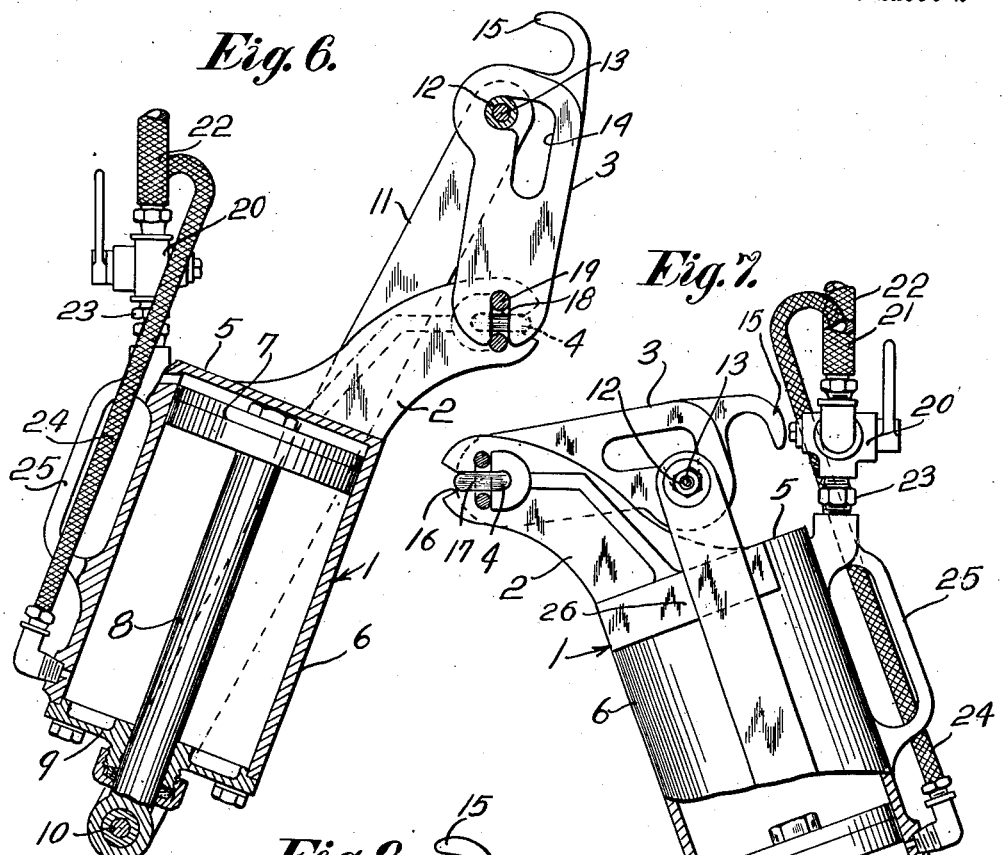
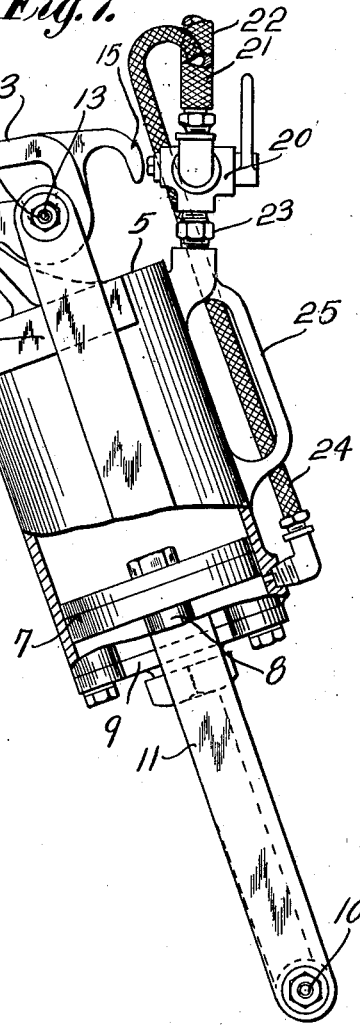
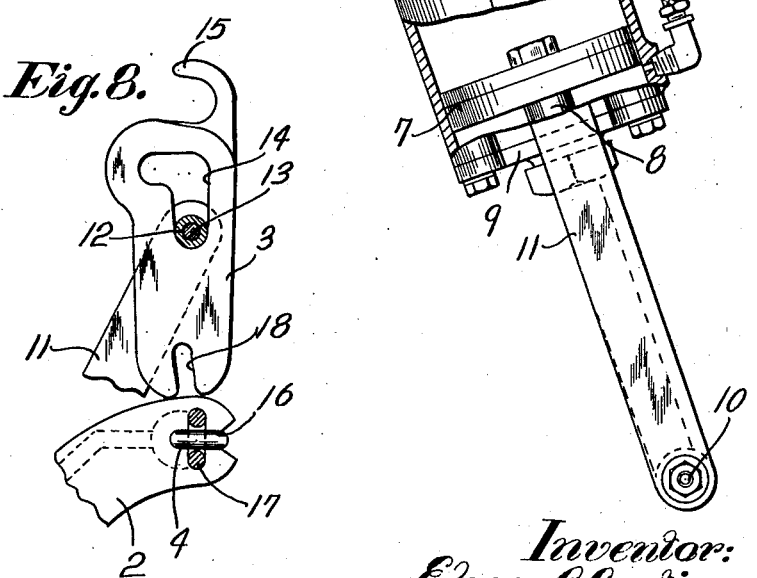
Inventor:
Elmer G. Gartin.
by
Lewis A. Maxon
Att'y.

Patented Aug. 8, 1944

2,355,523

UNITED STATES PATENT OFFICE 2,355,523

CHAIN BREAKER

Elmer G. Gartin, Claremont, N. H., assignor to Sullivan Machinery Company, a corporation of Massachusetts Application October 30, 1942, Serial No. 463,990

15 Claims. (Cl. 29—66)

The invention relates to chain breakers and more particularly to an improved fluid actuated device for breaking the links of a loose-link chain.

An object of the present invention is to provide a novel device for breaking the links of a chain. Another object is to provide an improved chain breaking device of the fluid operated type. Yet another object is to provide an improved power operated device for relatively twisting the links of a loose-link chain, thereby to effect fracture of the chain. A still further object is to provide a novel fluid operated device of the cylinder and piston type having relatively movable chain engaging elements respectively operatively connected to the cylinder and piston, for breaking the links of a chain. Still another object is to provide an improved power operated device having a relatively stationary element engaging a link of a chain and a relatively movable element engaging an adjacent chain link, together with novel means for effecting relative movement of the link engaging elements for breaking the chain. While the invention is susceptible of various modifications and alternative constructions, there is shown in the drawings and herein described in detail the preferred embodiment, but it is to be understood that it is not thereby intended to limit the invention to the specific form disclosed but rather to cover all modifications and alternative constructions falling within the spirit and scope of the invention as expressed in the appended claims.

In the drawings:

Fig. 1 is a front elevational view of the improved chain breaker, with parts shown in section to illustrate structural details.

Fig. 2 is a side elevational view of the chain breaker shown in Fig. 1.

Fig. 3 is a back elevational view looking in the direction opposite from that in Fig. 1.

Fig. 4 is a detail sectional view taken substantially on line 4—4 of Fig. 1.

Fig. 5 is a detail sectional view taken substantially on line 5—5 of Fig. 2.

Fig. 6 is a vertical sectional view taken substantially on line 6—6 of Fig. 1.

Fig. 7 is a side elevational view similar to Fig. 2, with parts in vertical section, and showing the breaker elements in a different position.

Fig. 8 is a fragmentary sectional view taken on the plane of Fig. 6, showing the chain engaging lever in its raised released position.

In this illustrative embodiment of the invention, there is shown a chain breaker generally designated 1, having a stationary breaker arm 2 and a swingable breaker lever 3, the arm and lever being engageable with adjacent links of a loose-link chain 4 and the lever being swingable relatively to the stationary arm to twist the adjacent chain links to break the chain. The stationary breaker arm 2 is herein preferably formed integral with the upper head 5 of a cylinder 6 which contains a reciprocable piston 7. The piston has a piston rod 8 extending downwardly through a packed opening in a lower cylinder head 9. The lower end of the piston rod is pivotally connected at 10 to parallel links 11 herein extending upwardly along the opposite sides of the cylinder, and the upper ends of these links are pivotally connected at 12 by a cross pin 13 to the outer end of the lever 3. The cross pin 13 passes through an L-shaped slot 14 providing a lost motion connection between the lever and the links, and the outer end of the lever has a hook-shaped finger grip portion 15 whereby the lever may be raised and lowered relative to the stationary arm 2. The stationary arm has a slot 16 shaped to receive a link 17 of the chain and the lever 3 has a similar slot 18 engageable with an adjacent chain link 19. By the provision of the L-shaped slot in the lever the latter may be raised or lowered to release the slot from or to engage the slot with the chain. Connected to a manually operable control valve 20 are supply and exhaust hose lines 21 and 22 and under certain conditions the breaker device may be suspended from these hose lines. Pipe connections 23 and 24 lead from the valve 20 respectively to the upper and lower ends of the cylinder at the opposite sides of the piston. Arranged at the side of the cylinder adjacent the valve is a conveniently located supporting handle 25 whereby the chain breaker may be readily supported and manipulated with respect to the work. The cylinder 6, at its opposite sides, has plane guide surfaces 26 for guiding the links 11 during swinging movement of the latter.

The mode of operation of the improved chain breaker will be clearly apparent from the description given. The operator may grasp the supporting handle 25 and move the chain breaker into a position to place the slot 16 of the stationary arm 2 into engagement with a link of a chain (Fig. 4), and then may move the lever 3 in the position shown in Fig. 8 downwardly to bring its slot 18 into engagement with an adjacent chain link. When the parts are in the position shown in Fig. 2, the operator may manipulate the control valve 20 to supply fluid under pressure through the hose line 21 and pipe connection 23 to the upper end of the cylinder to act on the upper pressure area of the piston while the lower end of the cylinder is connected through the pipe connection 24 to the exhaust hose line 22, and as a result, the piston is moved downwardly to actuate the links 11, thereby to effect swinging of the lever 3 from the position shown in Fig. 2 to the position shown in Fig. 7. As the lever 3 is swung about its pivot, the chain link 19 to which it is connected is twisted off relative to the chain link 17 rigidly held by the stationary arm 2, thereby breaking the chain. After the chain is twisted off, the control valve is manipulated to cut off the fluid supply to the upper end of the cylinder and to connect the upper cylinder end to the exhaust hose line 22. As the fluid is exhausted from the upper end of the cylinder above the piston, live pressure fluid is admitted through the pipe connection 24 to the lower end of the cylinder beneath the piston, thereby to act on the lower pressure area of the piston to effect movement of the piston into its raised inoperative position. Due to the provision of the separate fluid supply and exhaust hose lines, it is possible to operate the chain breaker while submerged under water.

As a result of this invention it will be noted that an improved chain breaker of a novel design is provided. It will further be evident that by the provision of the stationary breaker element and the cooperating relatively movable breaker element respectively engageable with adjacent links of the chain, the chain may be readily broken upon relative movement of the breaker elements. Further, by the provision of the extensible fluid cylinder and piston device and the novel connections between the cylinder and piston elements and the breaker elements, the chain may be easily twisted off. By connecting the breaker lever to the links through a lost motion connection, the breaker lever may be readily moved into and out of engagement with the chain. By holding one link of the chain and relatively twisting the adjacent link under the action of the power cylinder, it is found that usually a clean fracture results. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a chain breaker, a cylinder containing a piston, a breaker element connected to said cylinder and engageable with a link of a chain, a movable breaker element operatively connected to the piston and engaging an adjacent link of the chain, and means for operating said piston to move said movable breaker element relatively to said other breaker element to twist said chain links to effect fracture of the chain.

2. In a chain breaker, a cylinder containing a reciprocable piston, a breaker arm stationary with respect to said cylinder and engageable with a link of a chain, a swingable breaker lever engageable with an adjacent link of the chain and swingable relative to said stationary arm to twist said links to fracture the chain, operative connections between said breaker lever and said piston, and means for supplying fluid under pressure to said cylinder.

3. In a chain breaker, a cylinder containing a reciprocable piston, a breaker arm stationary with respect to said cylinder and engageable with a link of a chain, a swingable breaker lever engageable with an adjacent link of the chain and swingable relative to said stationary arm to twist said links to fracture the chain, a link extending between said breaker lever and said piston, and means for supplying fluid under pressure to said cylinder.

4. In a chain breaker, a cylinder containing a reciprocable piston, a breaker arm stationary with respect to said cylinder and engageable with a link of a chain, a swingable breaker lever engageable with an adjacent link of the chain, operative connections between said breaker lever and said piston, means for supplying fluid under pressure to said cylinder, and a lost motion connection embodied in said operative connections for permitting movement of said lever relative to said connections into and out of engagement with the chain.

5. In a chain breaker, a cylinder containing a reciprocable piston, a breaker arm stationary with respect to said cylinder and engageable with a link of a chain, a swingable breaker lever engageable with an adjacent link of the chain, a link extending between said breaker lever and said piston, means for supplying fluid under pressure to said cylinder, and a lost motion connection between said lever and said link for permitting movement of said lever relative to said link into and out of engagement with the chain.

6. In a chain breaker, a stationary breaker element engageable with a link of a chain, a movable breaker element engageable with an adjacent link of a chain, an extensible power operated device for effecting relative movement between said breaker elements to effect fracture of the chain, and a lost motion connection between said movable element and said extensible power device for permitting movement of said movable breaker element into and out of engagement with the chain.

7. In a chain breaker, relatively movable breaker elements engageable with different links of a chain, an extensible pressure fluid operated device for effecting such relative movement to twist said links to effect fracture of the chain, and means for delivering live fluid to said pressure fluid operating device to cause the same to effect chain fracture.

8. In a chain breaker, a portable frame having a handle whereby the frame may be transported and manually supported, means stationary with respect to said frame and supported thereby and engageable with a link of a chain to hold the link stationary, means mounted on said frame and engageable with an adjacent link of the chain and swingable relative to said first mentioned means to twist said links to fracture the chain, and power operated means carried by said frame for swinging said swingable link-engaging-means.

9. In a chain breaker, a portable frame having a handle whereby the frame may be transported and manually supported, means stationary with respect to said frame and supported thereby and engageable with a link of a chain to hold the link stationary, means mounted on said frame and engageable with an adjacent link of the chain and swingable relative to said first mentioned means to twist said links to fracture the chain, power operated means carried by said frame for swinging said swingable link-engaging-means, said power operated means having a movable power operated element projecting from the end of said frame remote from said stationary link-engaging-means, and connections between said power operated element and said swingable link-engaging-means.

10. In a chain breaker, a motor having a power cylinder containing a movable motor element, an arm stationary with respect to said cylinder and having an end shaped to engage a link of a chain, a swingable arm having one end shaped to engage an adjacent link of the chain, and connections between said movable motor element and the other end of said swingable arm, said swingable arm being swingable relative to said stationary arm to twist said links to fracture the chain.

11. In a portable chain breaker, a power cylinder containing a movable motor piston, an arm stationary with respect to and carried by said cylinder and enageable with a link of a chain, a swingable lever engageable with an adjacent chain link, and a connection between said piston and said swingable lever for swinging the latter relative to said stationary arm to twist said links to fracture the chain.

12. In a portable chain breaker, a power cylinder containing a movable motor piston, an arm stationary with respect to and carried by said cylinder and engageable with a link of a chain, a swingable lever engageable with an adjacent chain link, and a connection between said piston and said swingable lever for swinging the latter relative to said stationary arm to twist said links to fracture the chain, said connection extending along a side of said cylinder between the end of said lever remote from its chain-engaging-end and said piston.

13. In a chain breaker, a power device including relatively movable power actuated elements one of which is stationary with respect to the other, an element fixed with respect to said stationary element and having a portion shaped to engage a link of a chain, a cooperating swingable element operatively connected to said movable power actuated element and shaped to engage an adjacent chain link, and means for supplying operating medium to said power device to effect movement of said movable element to swing said swingable element thereby to twist said chain links to fracture the chain.

14. In a chain breaker, a motor having a cylinder containing a movable power actuated element, a lever arranged at one end of said cylinder in stationary relation with respect thereto and shaped to engage a link of a chain, a swingable lever engaging at one end an adjacent link of the chain and swingable relative to said stationary lever to twist said links to fracture the chain, and connections between said swingable lever and said power actuated element connected to the latter at the other end of said cylinder and to the other end of said swingable lever.

15. In a chain breaker, a stationary breaker element engageable with a link of a chain, a movable breaker element engageable with an adjacent link of the chain, a power operated device for effecting relative movement between said breaker elements to effect fracture of the chain, and a connection between said movable breaker element and said power operated device for permitting limited movement of said movable breaker element with respect to said power operated device into and out of engagement with the chain.

ELMER G. GARTIN.